(12) United States Patent
Bates et al.

(10) Patent No.: US 7,920,940 B2
(45) Date of Patent: Apr. 5, 2011

(54) PORTABLE DATA STORAGE CARTRIDGE COMPRISING A FIRST INFORMATION STORAGE MEDIUM AND A SECOND INFORMATION STORAGE MEDIUM

(75) Inventors: Allen Keith Bates, Tucson, AZ (US); Nils Haustein, Soergenloch (DE); James William Johnson, Tucson, AZ (US); Craig Anthony Klein, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 817 days.

(21) Appl. No.: 11/840,862

(22) Filed: Aug. 17, 2007

(65) Prior Publication Data
US 2009/0046335 A1    Feb. 19, 2009

(51) Int. Cl.
*G06F 7/00* (2006.01)
*G06F 12/00* (2006.01)
*G11B 21/08* (2006.01)
*G11B 23/03* (2006.01)

(52) U.S. Cl. ........ 700/213; 700/221; 700/244; 711/112; 720/743; 720/744; 720/728; 369/30.03

(58) Field of Classification Search .................. None
See application file for complete search history.

(56) References Cited

U.S. PATENT DOCUMENTS

2006/0200624 A1* 9/2006 Johnson et al. ............... 711/112
2007/0067792 A1* 3/2007 Kitagawa et al. ............. 720/744
\* cited by examiner

*Primary Examiner* — Gene Crawford
*Assistant Examiner* — Yolanda Cumbess
(74) *Attorney, Agent, or Firm* — Dale F. Regelman; Quarles & Brady LLP

(57) ABSTRACT

A portable data storage cartridge comprising a housing, a first information storage medium removeably disposed within the housing, a holographic data storage medium disposed within the housing, wherein the housing is formed to include an aperture, and wherein the holographic data storage medium is disposed adjacent the aperture.

16 Claims, 13 Drawing Sheets

US 7,920,940 B2

PORTABLE DATA STORAGE CARTRIDGE COMPRISING A FIRST INFORMATION STORAGE MEDIUM AND A SECOND INFORMATION STORAGE MEDIUM

FIELD OF THE INVENTION

The present invention relates generally to a portable data storage cartridge comprising a first information storage medium and a second information storage medium.

BACKGROUND OF THE INVENTION

The need to store and retrieve large volumes of digital data has resulted in the need for data storage devices having ever increasing amounts of storage capacity. Data can be stored, of course, in cassettes, floppy disks, diskettes, hard disks, optical disks, and the like. However, the greater the amount of memory available, the more difficult it becomes to accurately obtain specified data with rapid access times and with maximum system fault tolerance.

Automated data storage and retrieval systems, more commonly known as libraries, jukeboxes or auto changers (collectively referred to herein as "libraries"), are frequently used when there is a need to keep relatively large amounts of data available at a cost per gigabyte which is lower than that of solid state memory. Libraries are available for optical disks, optical tapes, magnetic disks, magnetic tapes, and the like. The information storage media are often disposed within a rigid protective housing comprising a cassette or a cartridge.

A typical library contains one or more banks, columns, or walls of storage cells, one or more data storage drives, and one or more accessors to transport designated portable data storage cartridges between those storage cells and data storage drives. Each accessor generally includes a hand-like gripper mechanism to remove and/or insert the portable data storage cartridges to and from a storage cell, and to and from a data storage drive. The library may also include an input/output station through which an operator can insert or withdraw data units into and from the interior of the library.

SUMMARY OF THE INVENTION

Applicants' invention comprises a portable data storage cartridge. The data storage cartridge comprises a housing, a first information storage medium removeably disposed within the housing, a holographic data storage medium disposed within the housing, wherein the housing is formed to include an aperture, and wherein the holographic data storage medium is disposed adjacent the aperture.

Applicants' invention further comprises a robotic accessor, wherein that accessor comprises a lasing device and an optical detector, wherein the accessor can releaseably grasp Applicants' portable data storage cartridge and decode information holographically encoded therein. Applicants' invention further comprises a data storage and retrieval system which comprises Applicants' portable data storage cartridge and Applicants' accessor. Applicants' invention further comprises a method using Applicants' portable data storage cartridge and Applicants' accessor.

Applicants' invention further comprises a data storage drive, wherein that data storage drive comprises a lasing device and an optical detector, wherein the data storage drive can releaseably mount Applicants' portable data storage cartridge and decode information holographically encoded therein. Applicants' invention further comprises a data storage and retrieval system which comprises Applicants' portable data storage cartridge and Applicants' data storage drive. Applicants' invention further comprises a method using Applicants' portable data storage cartridge and Applicants' data storage drive.

The foregoing and other features and advantages of the invention will be apparent from the following more particular description of preferred embodiments of the invention, as illustrated in the accompanying drawings.

DETAILED DESCRIPTION OF PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 3:
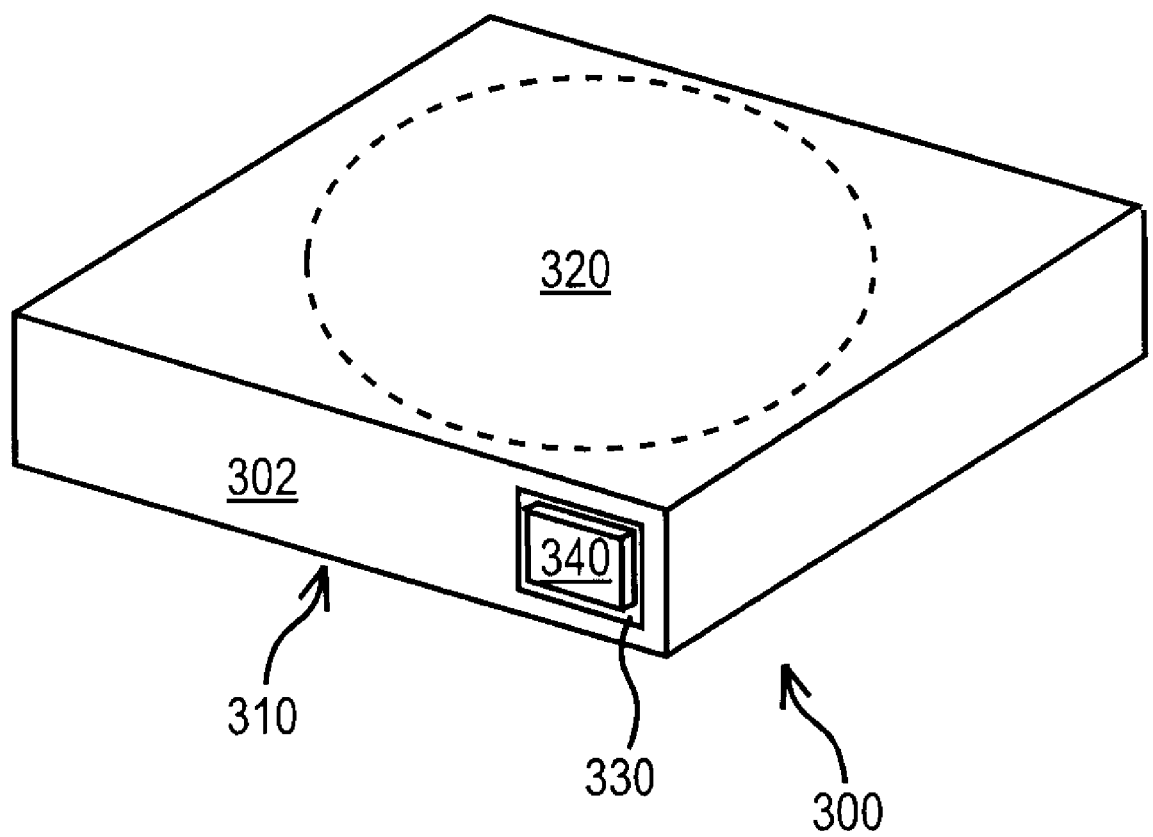
FIG. 3 is a perspective view of a first embodiment of Applicants' portable data storage cartridge.

Referring now to FIG. 3, Applicants' portable data storage cartridge 300 (FIGS. 3, 7, 8) comprises housing 310, first information storage medium 320 (FIGS. 3, 4A, 4B, 5A, 5B, 7, 8) removeably disposed within housing 310, and second information storage medium 340 (FIGS. 3, 4A, 4B, 4C, 4D, 4E, 5A, 5B, 6A, 6B, 7, 8) disposed within housing 310, wherein second information storage medium 340 comprises a holographic data storage medium. In the illustrated embodiment of FIG. 3, Applicants' portable data storage cartridge 300 (FIGS. 3, 7, 8) comprises a parallelepiped comprising 4 sides, a top, and a bottom.

As a general matter, Applicants' portable data storage cartridge comprises a plurality of members interconnected with one another to define an enclosed space. In the illustrated embodiment of FIG. 3, portable data storage cartridge 300 (FIGS. 3, 7, 8) comprises side 302, wherein side 302 is formed to include an aperture 330 extending therethrough. Further in the illustrated embodiment of FIG. 3, holographic data storage medium 340 (FIGS. 3, 4A, 4B, 4C, 4D, 4E, 5A, 5B, 6A, 6B, 7, 8) is disposed within housing 310 and adjacent aperture 330.

There are various features not shown on housing 310, such as locating notches, write-inhibiting switches, and the like. Housing 310 is only exemplary, and certain housing embodiments of present invention are applicable to any configuration of housing 310, and are useful for enclosing various information storage media.

In certain embodiments, first information storage medium 320 (FIGS. 3, 4A, 4B, 5A, 5B, 7, 8) comprises a magnetic information storage medium, such as and without limitation a magnetic tape, magnetic disk, and the like. In certain embodiments, first information storage medium 320 (FIGS. 3, 4A, 4B, 5A, 5B, 7, 8) comprises an optical information storage medium, such as and without limitation a CD, DVD, HD-DVD, Blu-Ray, and the like. In certain embodiments, first information storage medium 320 (FIGS. 3, 4A, 4B, 5A, 5B, 7, 8) comprises a membrane encoded using an Atomic Force Microscope (AFM) probe, such as for example and without limitation the IBM MILLIPEDE apparatus. In certain embodiments, first information storage medium 320 (FIGS. 3, 4A, 4B, 5A, 5B, 7, 8) comprises an electronic information storage medium, such as and without limitation, a PROM, EPROM, EEPROM, Flash PROM, COMPACTFLASH, SMARTMEDIA, and the like.

In certain embodiments, information is encoded in first information storage medium 320 (FIGS. 3, 4A, 4B, 5A, 5B, 7, 8) as a plurality of individual files, wherein each of those plurality of individual files comprises a unique identifier and a unique storage address. In certain embodiments, that plurality of file identifiers and associated storage addresses are holographically encoded within holographic data storage medium 340 (FIGS. 3, 4A, 4B, 4C, 4D, 4E, 5A, 5B, 6A, 6B, 7, 8). In certain embodiments, the plurality of file identifiers and storage addresses are written to a database encoded as a hologram in holographic data storage medium 340. In certain embodiments, the plurality of file identifiers and storage addresses are written to a look-up table encoded as a hologram in holographic data storage medium 340. In certain embodiments, the plurality of file identifiers and storage addresses are written to a File Allocation Table encoded as a hologram in holographic data storage medium 340.

Figure 5A:
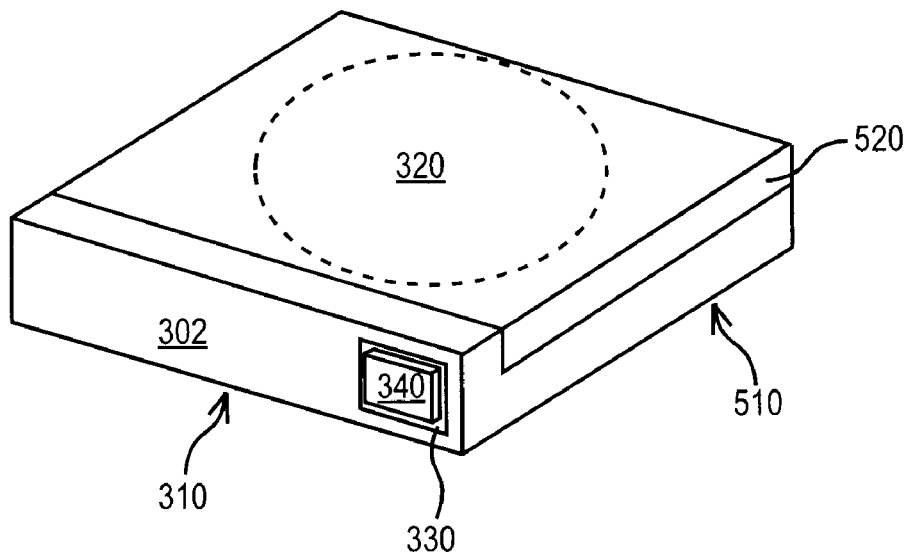
FIG. 5A is a perspective view of a third embodiment of Applicants' portable data storage cartridge comprising a pivotable top portion and a removable first information storage medium.
Figure 5B:
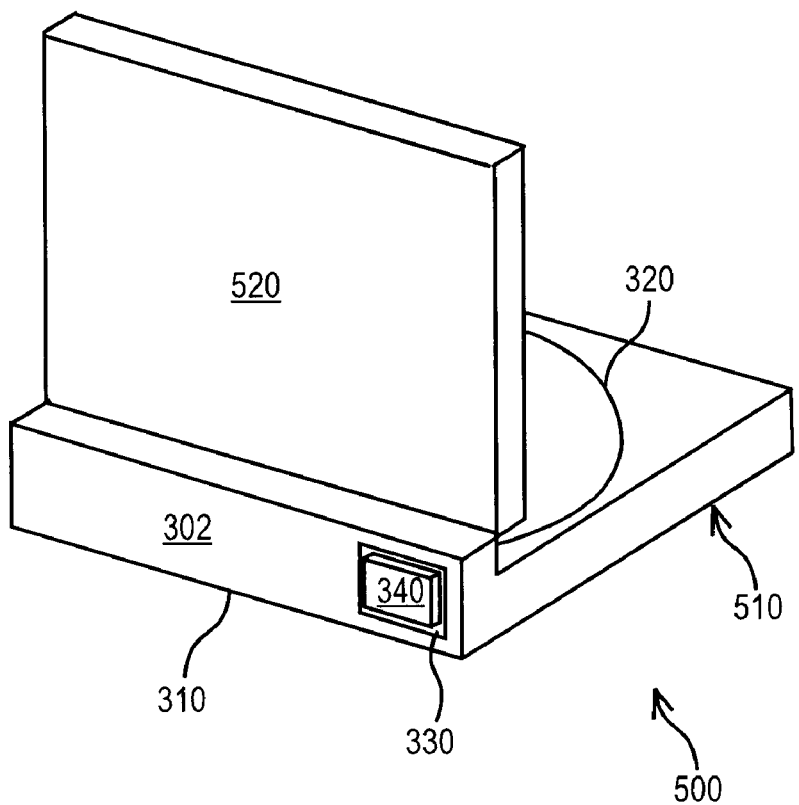
FIG. 5B is a perspective view of the embodiment of FIG. 5A with the top portion in an open configuration.
Figure 6A:
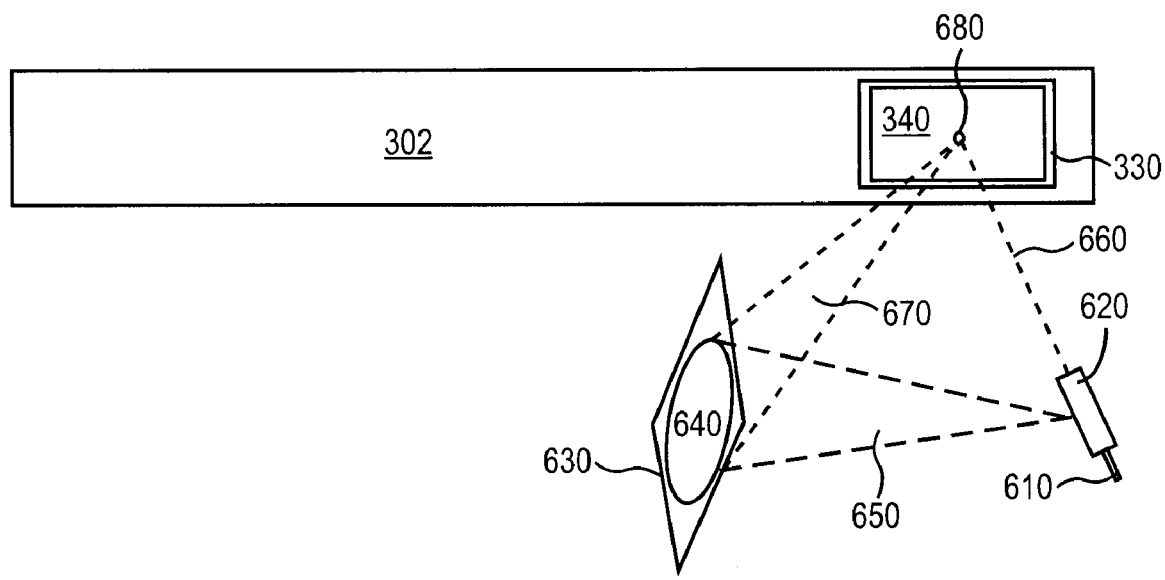
FIG. 6A is a view of Applicants' holographic write path.
Figure 6B:
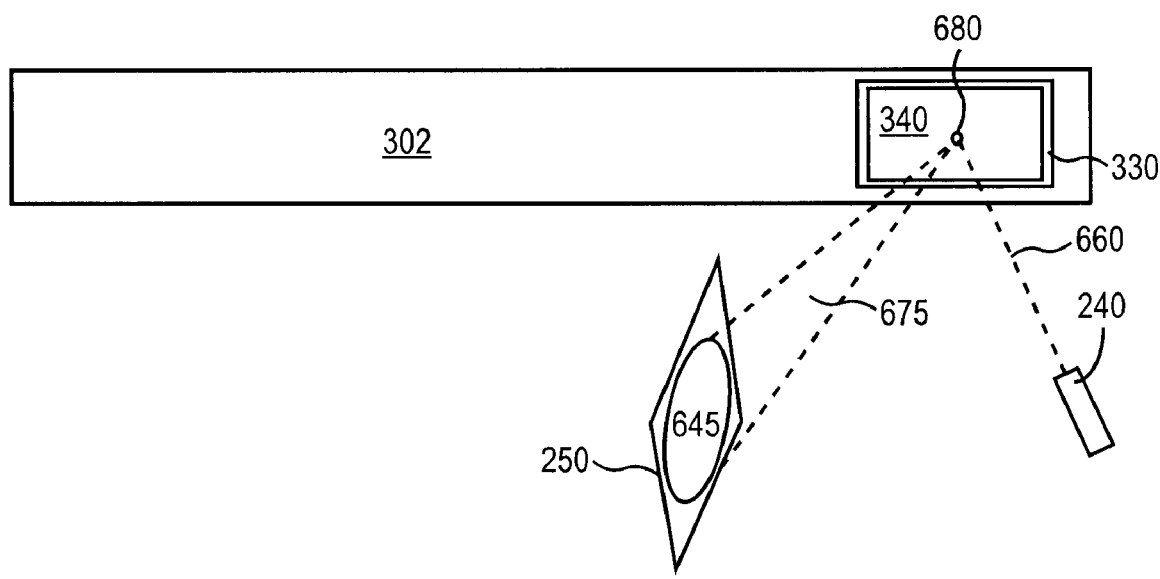
FIG. 6B is a view of Applicants' holographic read path.

Referring now to FIG. 6A, image 640 is shown displayed on reflective spatial light modulator 630, wherein image 640 comprises an image of a database, look-up table, or File Allocation Table, associating the above-described plurality of file identifiers with the corresponding storage addresses. Lasing device 610 generates a laser beam and provides that laser beam to beam splitter 620 which emits a carrier beam 650 and a reference beam 660. Reference beam 660 is directed through aperture 330, and onto holographic data storage medium 340 (FIGS. 3, 4A, 4B, 4C, 4D, 4E, 5A, 5B, 6A, 6B, 7, 8).

Carrier beam 650 is directed onto reflective spatial light modulator 630, wherein carrier beam picks up image 640 to form data beam 670 which is directed through aperture 330, wherein data beam 670 interacts with reference beam 660 within holographic data storage medium 340 (FIGS. 3, 4A, 4B, 4C, 4D, 4E, 5A, 5B, 6A, 6B, 7, 8) to form a hologram comprising image 640, wherein that hologram is encoded into holographic data storage medium 340 as interference pattern 680.

Figure 4A:
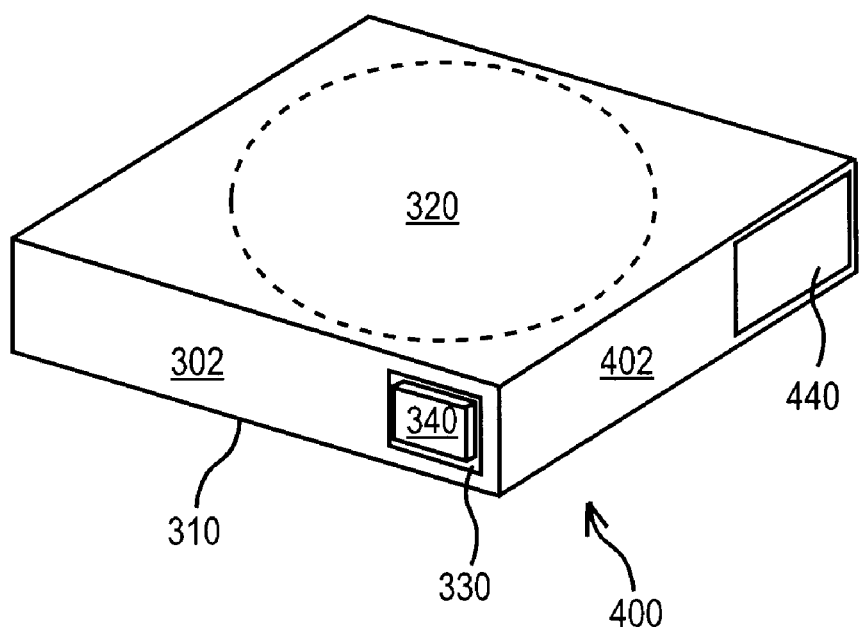
FIG. 4A is a perspective view of a second embodiment of Applicants' portable data storage cartridge, wherein that embodiment comprises a slideable door assembly shown in a closed configuration.
Figure 4B:
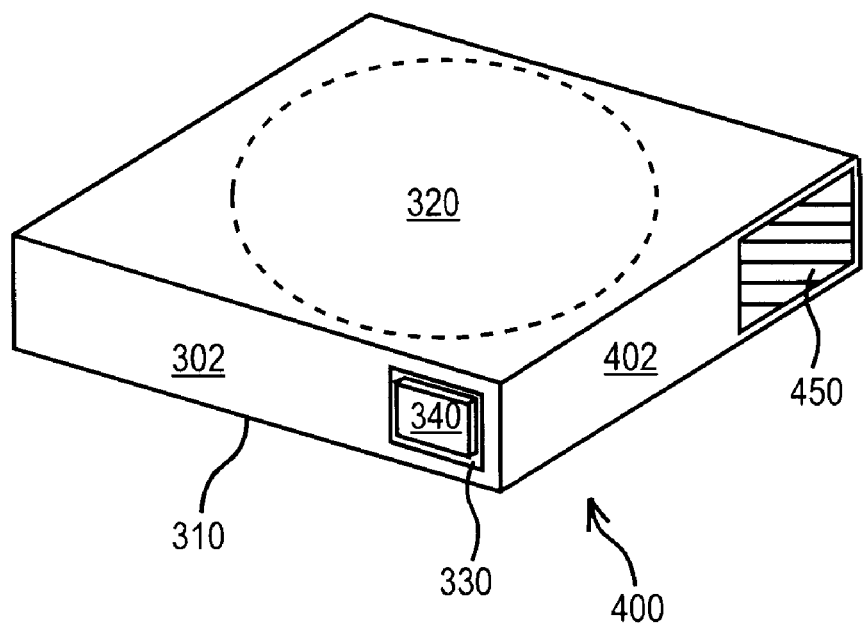
FIG. 4B is a perspective view of the portable data storage cartridge of FIG. 4A wherein the slideable door assembly is disposed in an open configuration.
Figure 4C:
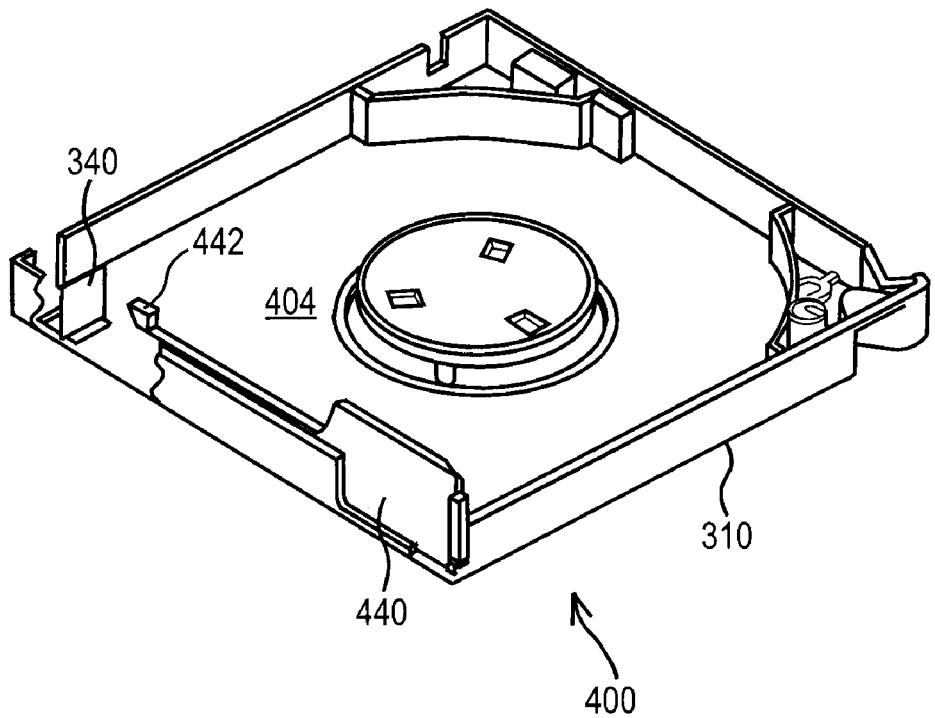
FIG. 4C is a perspective view showing the interior of the portable data storage cartridge of FIG. 4A.
Figure 4D:
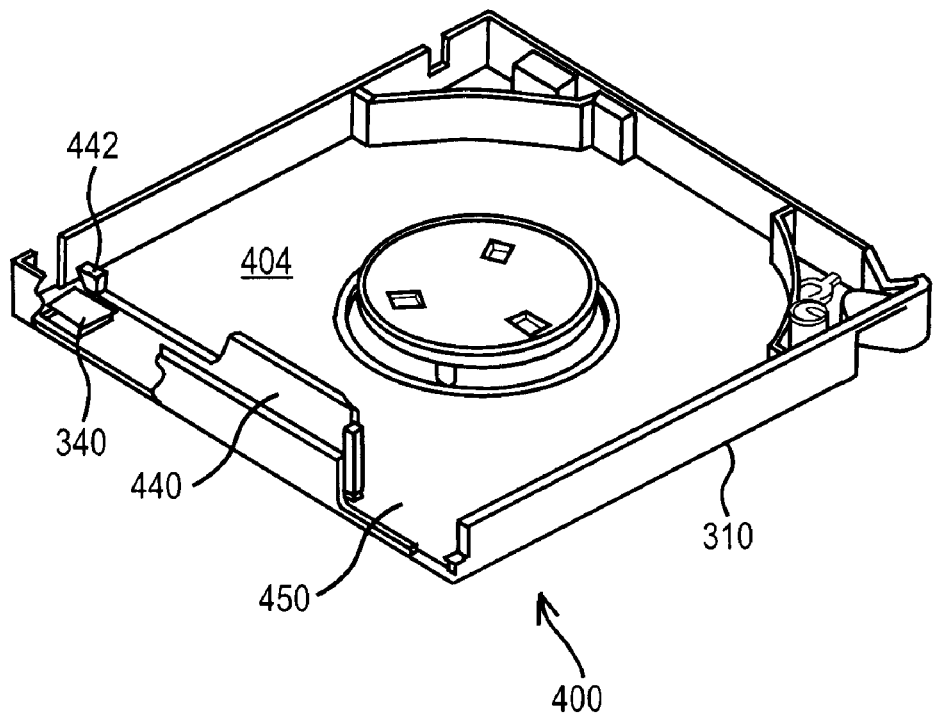
FIG. 4D is a perspective view showing the interior of the portable data storage cartridge of FIG. 4B.

In the illustrated embodiments of FIGS. 4A, 4B, 4C, and 4D, Applicants' portable data storage cartridge 400 (FIGS. 4A, 4B, 4C, 4D, 7, 8) is formed to include aperture 330 and aperture 450, wherein member 440 is slideably disposed within housing 310, parallel to side 402, such that member 440 can be moved between a first position of FIGS. 4A and 4C, and a second position of FIGS. 4B and 4D. In the first position of FIGS. 4A and 4C, member 440 closes aperture 450. In the second position of FIGS. 4B and 4D, member 440 does not obstruct aperture 450. In certain embodiments, side 402 is adjacent to side 302.

Figure 4E:
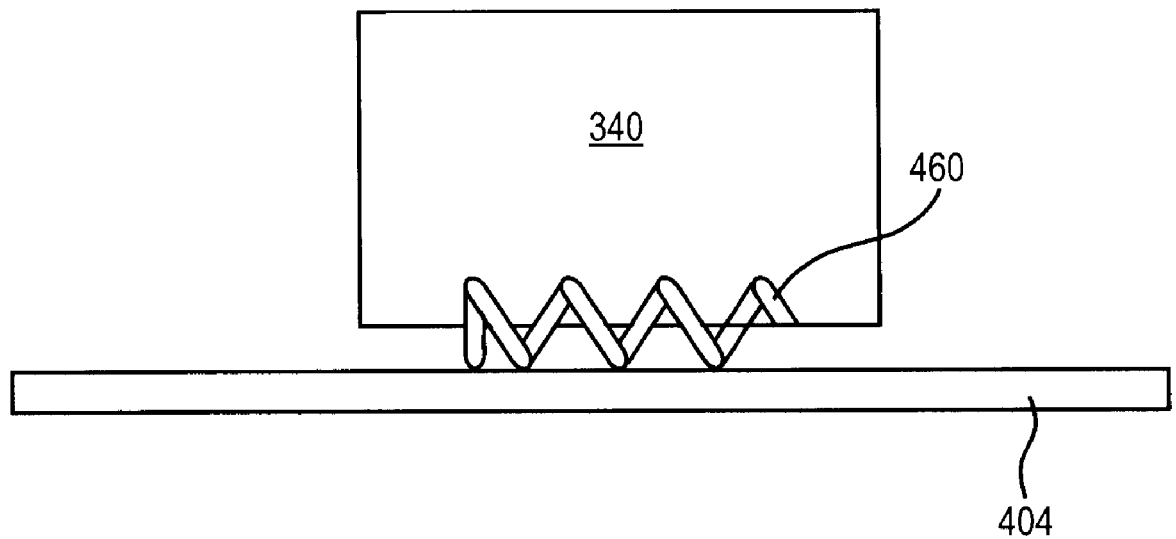
FIG. 4E is front view showing the holographic data storage medium of FIGS. 4A and 4B pivotably mounted on a spring.

In the illustrated embodiment of FIGS. 4C, 4D, and 4E, holographic data storage medium 340 (FIGS. 3, 4A, 4B, 4C, 4D, 4E, 5A, 5B, 6A, 6B, 7, 8) is pivotably mounted to floor portion 404 of housing 400, and member 440 comprises distal end 442. In certain embodiments and as shown in the illustrated embodiment of FIG. 4E, holographic data storage medium 340 is pivotably attached to floor 404 using spring 460, wherein spring 460 holds holographic data storage medium 340 in the vertical orientation shown in FIGS. 4C and 4E. When member 440 comprising distal end 442 is placed in the second position of FIG. 4D, distal end 442 urges holographic data storage medium 340 downwardly into a horizontal orientation. When member 440 is returned to the first position of FIGS. 4A and 4C, spring 460 pulls holographic data storage medium 340 from the horizontal orientation of FIG. 4D to the vertical orientation of FIG. 4C.

Referring now to FIGS. 5A and 5B, embodiment 500 (FIGS. 5A, 5B, 7, 8) of Applicants' portable data storage cartridge comprises housing 310, first information storage medium 320 (FIGS. 3, 4A, 4B, 5A, 5B, 7, 8), side 302 formed to include aperture 330, and holographic data storage medium 340 (FIGS. 3, 4A, 4B, 4C, 4D, 4E, 5A, 5B, 6A, 6B, 7, 8) disposed within housing 3 10 and adjacent aperture 330. In the illustrated embodiment of FIGS. 5A and 5B, housing 310 comprises bottom 510 and top 520, wherein top 520 is pivotably attached to bottom 510. When top 520 is disposed in the first position of FIG. 5A, first information storage medium 320 is enclosed within housing 310. When top 520 is disposed in the second position of FIG. 5B, first information storage medium 320 can be removed from housing 310.

In certain embodiments, Applicants' portable data storage cartridge is moveably disposed within an automated data storage and retrieval system. In certain embodiments, Applicants' data storage and retrieval system comprises a robotic accessor comprising a lasing device and an optical detector, wherein that robotic accessor can decode information holographically encoded in holographic data storage medium 340. In certain embodiments, Applicants' data storage and retrieval system comprises a data storage drive comprising a lasing device and an optical detector, wherein that data storage drive can decode information holographically encoded in holographic data storage medium 340. In certain embodiments, Applicants' data storage and retrieval system comprises both a robotic accessor and a data storage drive, wherein both the accessor and the data storage drive comprise a lasing device and an optical detector, and can decode information holographically encoded in holographic data storage medium 340.

Figure 1:
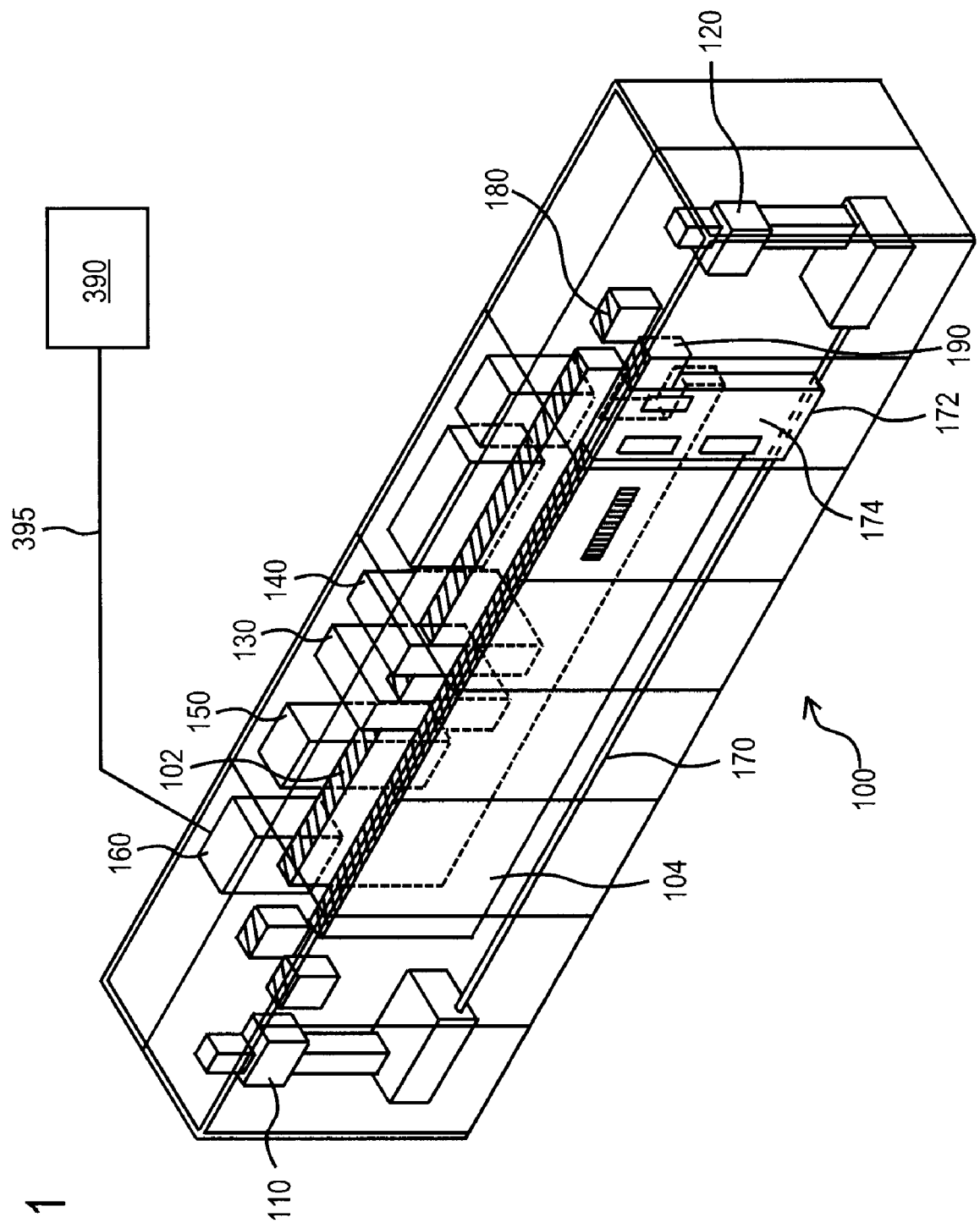
FIG. 1 is a perspective view of one embodiment of Applicants' data storage and retrieval system.

Referring to FIG. 1, Applicants' automated data storage and retrieval system 100 is shown having a first wall of storage slots 102 and a second wall of storage slots 104. One or more of Applicants' portable data storage cartridges 300 (FIGS. 3, 7, 8)/400 (FIGS. 4A, 4B, 4C, 4D, 7, 8)/500 (FIGS. 5A, 5B, 7, 8) are individually stored in these storage slots.

Applicants' automated data storage and retrieval system includes one or more accessors, such as accessors 110 and 120. An accessor is a robotic device which retrieves a portable data storage cartridge from first storage wall 102 or second storage wall 104, transports that accessed portable data storage cartridge to one of data storage drives 130/140 for reading and/or writing data thereon, mounts the accessed portable data storage cartridge in the selected data storage drive, and/or returns the portable data storage cartridge to a designated storage slot.

In the illustrated embodiment of FIG. 1, accessors 110 and 120 travel bi-directionally along rail 170 in an aisle disposed between first wall of storage slots 102 and second wall of storage slots 104. Library controller 160 controls the operations of accessors 110/120 and data storage drives 130/140. Library controller 160 includes at least one computing processor.

In the illustrated embodiment of FIG. 1, library controller 160 is disposed within system 100, wherein library controller 160 communicates with host computer 390 via communication link 395. In alternative embodiments, library controller 160 is located external to system 100.

In certain embodiments, library controller 160 receives instructions from host computer 390. In certain embodiments, data to be recorded onto, or read from, a selected portable data storage cartridge is communicated between the data storage drives 130/140 and host computer 390 via library controller 160. In alternative embodiments, data to be recorded onto, or read from, a selected portable data storage cartridge is communicated directly between data storage drive 130 (FIGS. 1, 7, 8)/140 and host computer 390.

Operator input station 150 permits an operator to communicate with Applicants' automated data storage and retrieval system 100. Power component 180 and power component 190 each comprise one or more power supply units which supply power to the individual components disposed within Applicants' automated data storage and retrieval system.

Import/export port 172 include access door 174 pivotally attached to the side of system 100. Portable data storage cartridges can be placed in the system, or in the alternative, removed from the system, via port 172/access door 174.

In certain embodiments, accessor 110 and/or 120 comprises a lasing device and an optical detector positioned such that the accessor can decode information from holographic data storage medium 340 (FIGS. 3, 4A, 4B, 4C, 4D, 4E, 5A, 5B, 6A, 6B, 7, 8) while a gripper mechanism 230 (FIG. 2) holds Applicants' portable data storage cartridge 300 (FIGS. 3, 7, 8), or portable data storage cartridge 400 (FIGS. 4A, 4B, 4C, 4D, 7, 8), or portable data storage cartridge 500 (FIGS. 5A, 5B, 7, 8).

Figure 2:
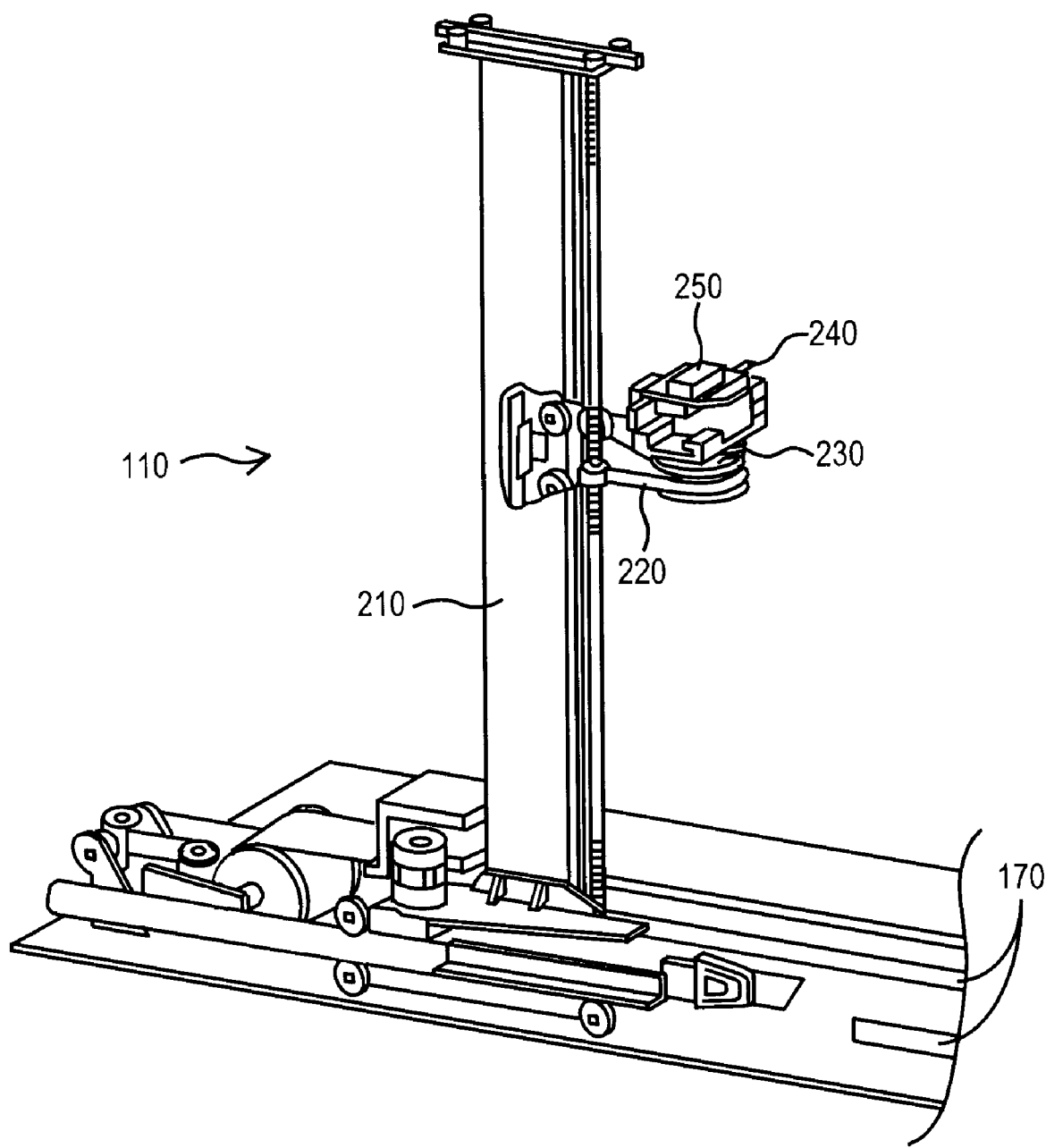
FIG. 2 is a perspective illustration of Applicants' robotic accessor moveably disposed within Applicants' data storage and retrieval system.
Figure 7:
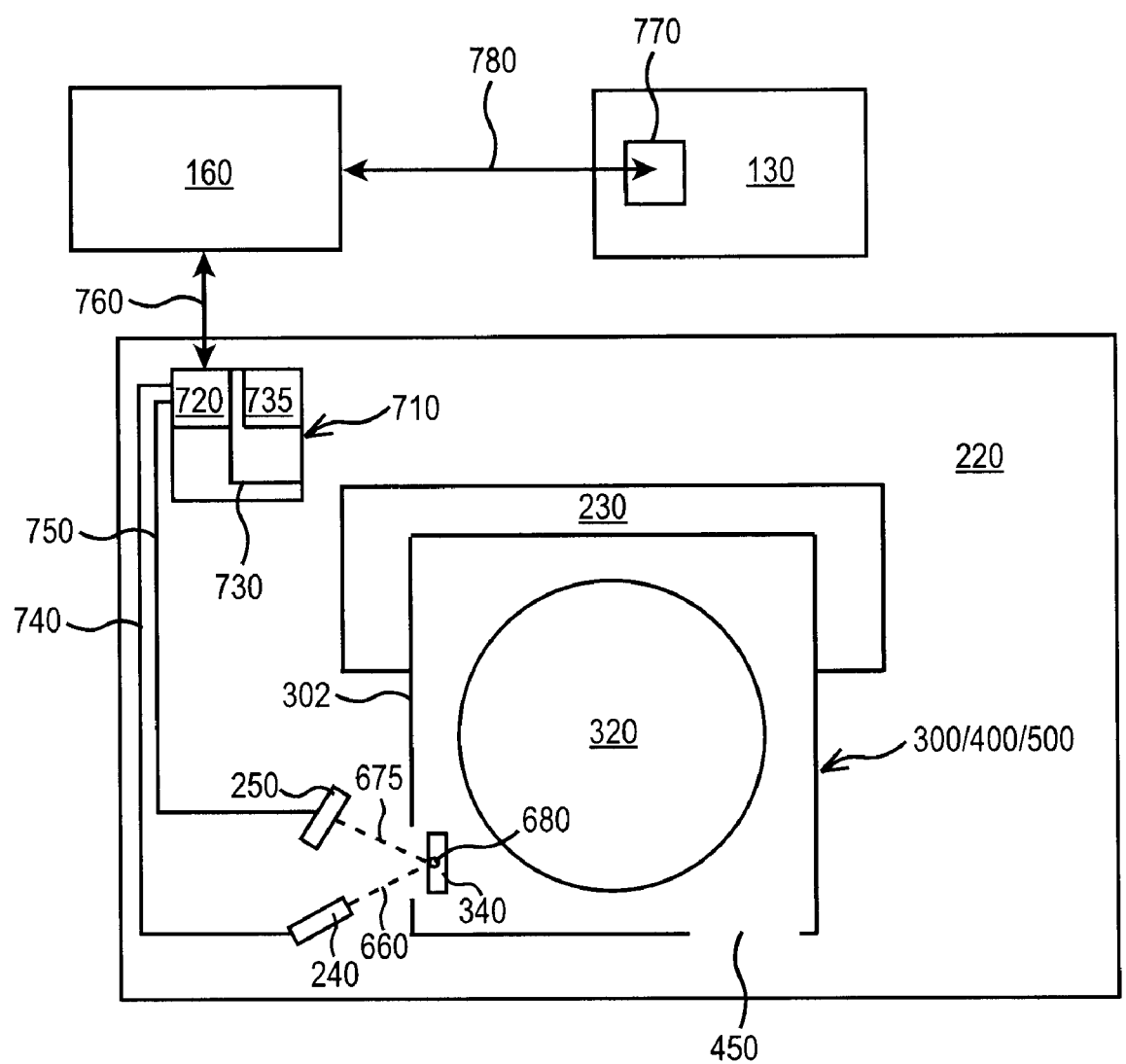
FIG. 7 is a block diagram illustrating Applicants' Applicants' portable data storage cartridge releaseably attached to accessor.

Referring to FIGS. 2 and 7, accessor 110 travels bi-directionally along rail system 170. In the embodiment shown in FIG. 2, rail system 170 comprises two parallel rails. Accessor 110 comprises vertical pillar 210, and lifting servo section 220 moveably disposed on vertical pillar 210. Accessor 110 further comprises gripper mechanism 230, lasing device 240, optical detector 250, and accessor control card 710 disposed on lifting servo section 220. Accessor control card comprises processor 720, memory 730, and instructions 735 encoded in memory 730.

Referring now to FIGS. 2, 6B, 7, and 9, Applicants' invention includes a method to decode a hologram disposed in Applicants' portable data storage cartridge using Applicants' accessor, while that accessor transports the portable data storage cartridge to a compatible data storage device. In step 910, the method dispatches an accessor to retrieve a portable data storage cartridge 300 (FIGS. 3, 7, 8) or 400 (FIGS. 4A, 4B, 4C, 4D, 7, 8) or 500 (FIGS. 5A, 5B, 7, 8), wherein that cartridge comprises a plurality of files written to a first information storage medium 320 (FIGS. 3, 4A, 4B, 5A, 5B, 7, 8) disposed therein, and wherein a plurality of file identifiers and associated storage addresses are holographically encoded in information storage medium 340 (FIGS. 3, 4A, 4B, 4C, 4D, 4E, 5A, 5B, 6A, 6B, 7, 8).

In step 920, Applicants' accessor 110 releaseably holds Applicants' portable data storage cartridge 300/400/500 using gripper mechanism 230 such that side 302 faces lasing device 240 and optical detector 250. Lasing device 240 is interconnected with accessor control card 710 via communication link 740. In step 930 and in response to a signal from accessor control card 710, lasing device 240 directs reference beam 660 through aperture 330 and onto interference pattern 680 (FIGS. 6A, 6B, 7, 8), thereby generating reconstructed data beam 675 which comprises a reconstructed image 645 comprising the database, look-up table, or file allocation table displayed in image 640 (FIG. 6A). Reconstructed image 645 is projected onto optical detector 250.

Optical detector 250 is interconnected with accessor control card 710 via communication link 750. In step 940, optical detector 250 captures the file identifiers and associated storage addresses recited in reconstructed image 645, and provides those file identifiers and associated storage addresses to accessor control card 710 via communication link 750. Accessor control card is in communication with library controller 160 via communication link 760. In certain embodiments, communication link 760 comprises a wireless communication link, such as an optical link or a Bluetooth link, and the like.

Figure 8:
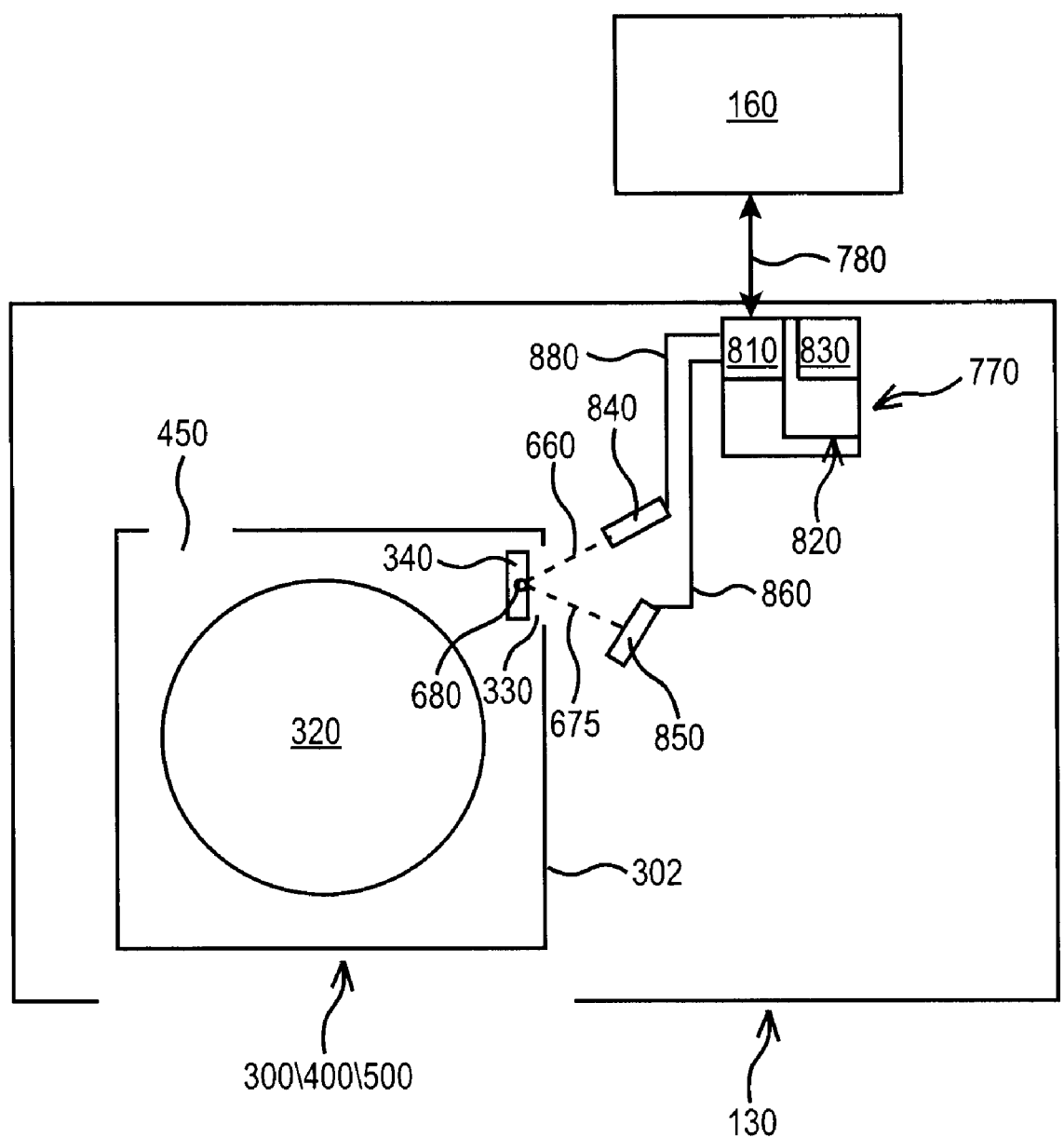
FIG. 8 is a block diagram illustrating Applicants' data drive with Applicants' portable data storage cartridge removeably disposed therein.

In step 950, accessor control card 710 provides the file identifiers and associated storage addresses decoded from holographic data storage medium to library controller via communication link 760. Library controller 160 is interconnected with data drive controller 770 via communication link 780, wherein data drive controller 770 is disposed in data storage drive 130 (FIGS. 1, 7, 8). Library controller 160 provides the file identifiers and associated storage addresses decoded from holographic data storage medium to data drive controller 770 via communication link 780.

In certain embodiments, library controller 160 provides the file identifiers and associated storage addresses decoded from holographic data storage medium to data drive controller 770 while accessor 110 is transporting the accessed portable data storage cartridge to data storage drive 130 (FIGS. 1, 7, 8). In these embodiments, data drive controller 770 receives the file identifiers for each file written to first information storage medium 320, and the storage addresses for each of the files written to first information storage medium 320, before first information storage medium 320 (FIGS. 3, 4A, 4B, 5A, 5B, 7, 8) is mounted in data storage drive 130 (FIGS. 1, 7, 8).

In step 960, the dispatched accessor delivers the accessed portable data storage medium to the designated data storage device. Further in step 960, the accessed portable data storage medium is mounted in the designated data storage device.

Figure 10:
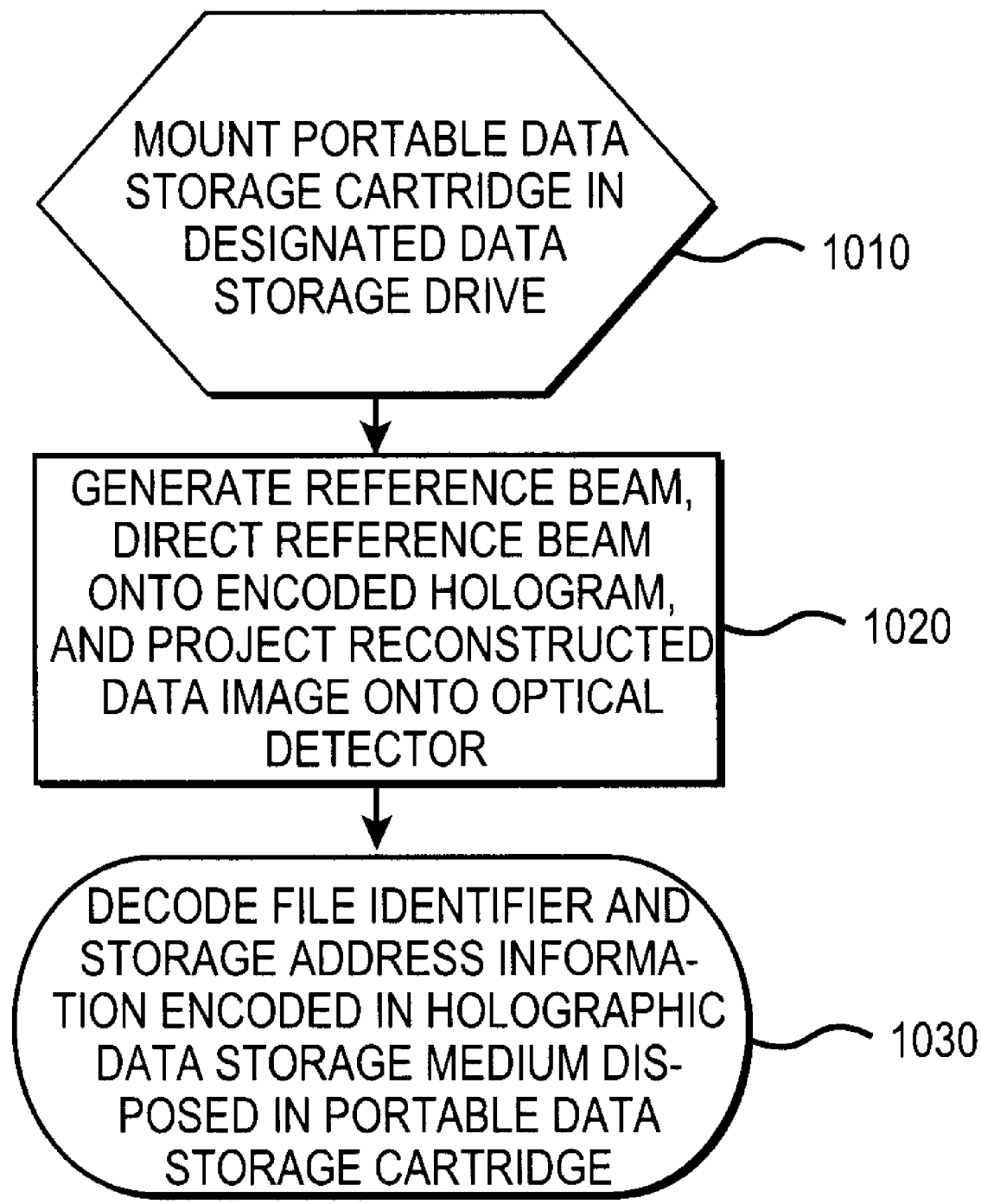
FIG. 10 is a flowchart summarizing the steps of Applicants' method to decode information from a holographic data storage medium disposed in Applicants' portable data storage cartridge using Applicants' data storage drive.

In certain embodiments, Applicants' invention comprises a method which employs Applicants' portable data storage cartridge and a data storage drive which comprises a lasing device and an optical detector. Referring now to FIGS. 8 and 10, in the illustrated embodiment of FIG. 8 data storage drive 130 (FIGS. 1, 7, 8) comprises lasing device 840 and optical detector 850 disposed therein.

In step 1010, the method mounts Applicants' portable data storage cartridge 300/400/500 in Applicants' data storage drive 130, such that aperture 330 is disposed adjacent lasing device 840 and optical detector 850. In the illustrated embodiment of FIG. 8, data storage drive 130 (FIGS. 1, 7, 8) comprises drive controller 770. Drive controller 770 comprises processor 810, memory 820, and instructions 830 written to memory 820. As those skilled in the art will appreciate, data storage drive 130 (FIGS. 1, 7, 8) comprises additional elements comprising software, firmware, and/or hardware, to read information from, and write information to, an information storage medium disposed therein. Lasing device 840 is interconnected with drive controller 770 via communication link 830.

In step 1020 and in response to a signal from drive controller 770, lasing device 840 directs reference beam 660 through aperture 330 and onto interference pattern 680 in holographic data storage medium 340, thereby generating reconstructed data beam 675 which comprises a reconstructed image 645 (FIG. 6B) comprising the database, look-up table, or file allocation table, displayed in image 640 (FIG. 6A). Reconstructed image 645 is projected onto optical detector 850. Optical detector 850 is interconnected with drive controller 770 via communication link 860.

In step 1030, optical detector 850 captures the file identifiers and associated storage addresses recited in reconstructed image 645, and provides those file identifiers and associated storage addresses to drive controller 770.

Figure 9:
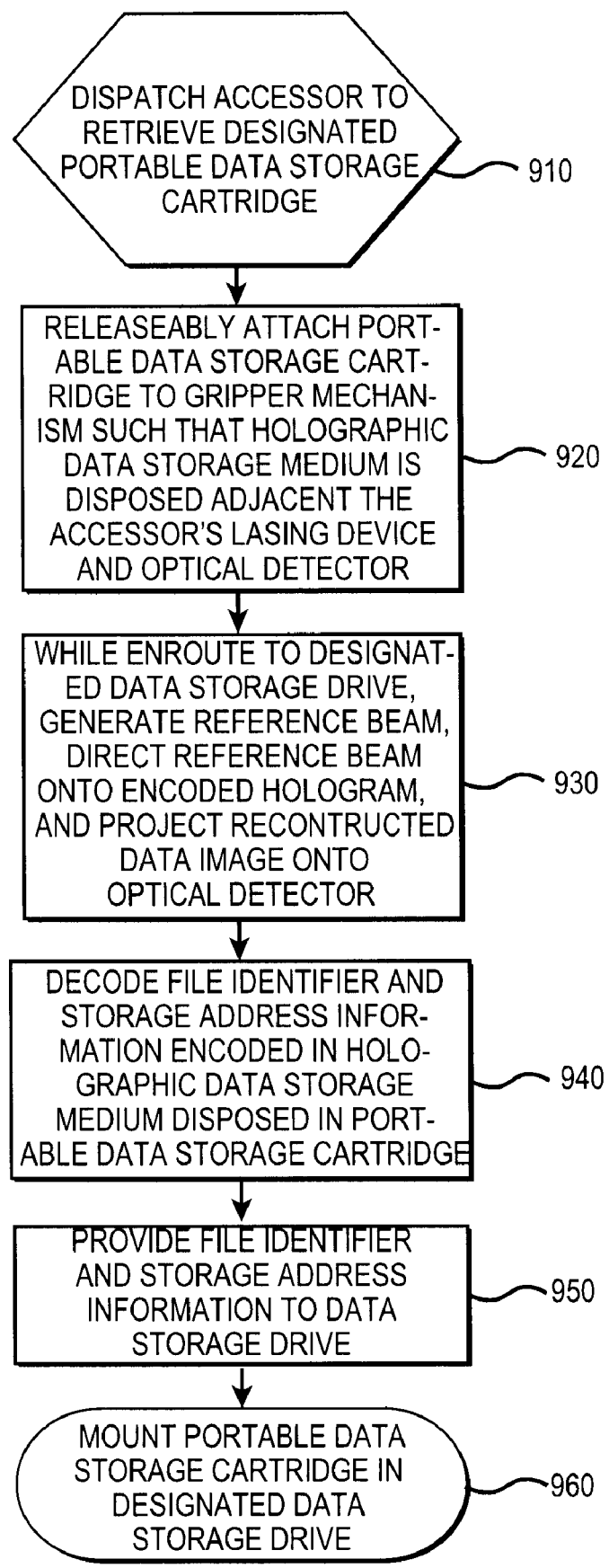
FIG. 9 is a flowchart summarizing the steps of Applicants' method to decode information from a holographic data storage medium disposed in Applicants' portable data storage cartridge using Applicants' robotic accessor.

In certain embodiments, individual steps recited in FIG. 9 may be combined, eliminated, or reordered.

In certain embodiments, Applicants' invention includes instructions, such as instructions 735 (FIG. 7), residing in memory 730 (FIG. 7), where those instructions are executed by a processor, such as processor 720 (FIG. 7), to perform one or more of steps 930, 940, 950, and/or 960, recited in FIG. 9. In certain embodiments, Applicants' invention includes instructions, such as instructions 830 (FIG. 8), residing in memory 820 (FIG. 8), where those instructions are executed by a processor, such as processor 810 (FIG. 8), to perform one or more of steps 970, 980, and/or 990, recited in FIG. 9. Instructions 735 and/or 830 may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, COMPACTFLASH, SMARTMEDIA, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A portable data storage cartridge, comprising:
   a housing;
   a first information storage medium removeably disposed within said housing;
   a second information storage medium comprising a holographic data storage medium disposed within said housing;
   a member slidably disposed within said housing;
   wherein:
   said housing is formed to include a first aperture and a second aperture;
   said second information storage medium is disposed adjacent said first aperture;
   said member can be moved from a first position wherein said member covers said second aperture to a second position wherein said member does not cover said second aperture.

2. The portable data storage cartridge of claim 1, wherein said first information storage medium is selected from the group consisting of a magnetic information storage medium, a membrane encoded using atomic force microscope probes, an optical information storage medium, and an electronic information storage medium.

3. The portable data storage cartridge of claim 1, further comprising:
   a plurality of files encoded in said first information storage medium, wherein each of said plurality of files comprises a unique identifier and storage address;
   wherein said plurality of file identifiers and a plurality of associated storage addresses are holographically encoded in said second information storage medium.

4. The portable data storage cartridge of claim 1, wherein:
   said housing comprises a bottom and a top releaseably attached to said bottom;
   said first information storage medium can be removed from said housing when said top is not attached to said bottom.

5. An accessor for transporting a portable data storage cartridge within a data storage and retrieval system, comprising:
   a gripper mechanism;
   a lasing device;
   an optical detector;
   a lifting servo section, wherein said gripper mechanism, said lasing device, and said optical detector are disposed on said lifting servo section;
   wherein said gripper mechanism can releaseably hold a portable data storage cartridge comprising, a housing, a first information storage medium removeably disposed within said housing, a second information storage medium comprising a holographic data storage medium disposed within said housing, wherein said housing is formed to include a first aperture, and wherein said second information storage medium is disposed adjacent said aperture;

wherein said lasing device is positioned on said accessor such that said lasing device can direct a laser beam through said aperture and onto said second information storage medium; and wherein said optical detector is positioned on said accessor such that a reconstructed data beam generated by the interaction of said laser beam with a hologram encoded in said second information storage medium is projected onto said optical detector.

6. The accessor of claim 5, wherein said first information storage medium is selected from the group consisting of a magnetic information storage medium, a membrane encoded using atomic force microscope probes, an optical information storage medium, and an electronic information storage medium.

7. The accessor of claim 5, wherein said first information storage medium comprises a plurality of files encoded therein, wherein each of said plurality of files comprises a unique identifier and storage address;

wherein said plurality of file identifiers and a plurality of associated storage addresses are holographically encoded in said second information storage medium.

8. The accessor of claim 5, further comprising:
an accessor control card;
wherein said lasing device and said optical detector are in communication with said accessor control card.

9. The data storage and retrieval system of claim 5, further comprising:
a data storage drive comprising a drive controller;
wherein said lasing device and said optical detector are in communication with said drive controller.

10. A data storage and retrieval system, comprising:
an accessor for transporting a portable data storage cartridge, wherein said accessor comprises a gripper mechanism, a lasing device, and an optical detector, a lifting servo section, wherein said gripper mechanism can releaseably hold a portable data storage cartridge comprising a housing, a first information storage medium removeably disposed within said housing, a second information storage medium comprising a holographic data storage medium disposed within said housing, wherein said housing is formed to include a first aperture, wherein said second information storage medium is disposed adjacent said aperture, and wherein said gripper mechanism, said lasing device, and said optical detector are disposed on said lifting servo section;

wherein said lasing device is positioned on said accessor such that said lasing device can direct a laser beam through said aperture and onto said second information storage medium; and wherein said optical detector is positioned on said accessor such that a reconstructed data beam generated by the interaction of said laser beam with a hologram encoded in said second information storage medium is projected onto said optical detector.

11. The data storage and retrieval system of claim 10, wherein said first information storage medium is selected from the group consisting of a magnetic information storage medium, a membrane encoded using atomic force microscope probes, an optical information storage medium, and an electronic information storage medium.

12. The data storage and retrieval system of claim 10, wherein said first information storage medium comprises a plurality of files encoded therein, wherein each of said plurality of files comprises a unique identifier and storage address;

wherein said plurality of file identifiers and a plurality of associated storage addresses are holographically encoded in said second information storage medium.

13. A method to read data from a portable data storage cartridge, comprising the steps of:
providing a portable data storage cartridge comprising a housing, a first information storage medium removeably disposed within said housing, a second information storage medium comprising a holographic data storage medium disposed within said housing, wherein said housing is formed to include a first aperture, and wherein said second information storage medium is disposed adjacent said aperture, and wherein one or more files are encoded in said first information storage medium, and wherein each of said one or more files comprises a file identifier and an associated storage address;
emitting a reference beam by a lasing device, wherein said reference beam is directed onto a hologram encoded in said second data storage medium to generate a reconstructed data beam comprising an image comprising said one or more of file identifiers and said associated storage addresses, wherein said reconstructed data beam is projected onto an optical detector;
capturing said one or more of file identifiers and associated storage addresses from said reconstructed data beam;
providing a data storage drive capable of reading said files encoded in said first information storage medium, wherein said data storage drive comprises said lasing device and said optical detector;
mounting said portable data storage device in said data storage drive;
wherein said emitting step and said capturing step are performed within said data storage device.

14. The method of claim 13, wherein said first information storage medium is selected from the group consisting of a magnetic information storage medium, a membrane encoded using atomic force microscope probes, an optical information storage medium, and an electronic information storage medium.

15. The method of claim 13, further comprising the steps of:
providing an accessor comprising a gripper mechanism, said lasing device, and said optical detector;
releaseably attaching said portable information storage cartridge to said gripper mechanism;
wherein said emitting step and said capturing step are performed while said portable information storage cartridge is releaseably attached to said gripper mechanism;
providing by said accessor said one or more of file identifiers and associated storage addresses to a data storage drive capable of reading said files encoded in said first information storage medium.

16. The method of claim 15, wherein said first information storage medium is selected from the group consisting of a magnetic information storage medium, a membrane encoded using atomic force microscope probes, an optical information storage medium, and an electronic information storage medium.

* * * * *